(12) United States Patent
Matsuoka et al.

(10) Patent No.: US 12,725,277 B2
(45) Date of Patent: Sep. 1, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Asuka Matsuoka, Kanagawa (JP); Takuya Iwata, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 266 days.

(21) Appl. No.: 18/665,722

(22) Filed: May 16, 2024

(65) Prior Publication Data

US 2024/0404076 A1 Dec. 5, 2024

(30) Foreign Application Priority Data

May 30, 2023 (JP) ................................ 2023-089116
Jan. 24, 2024 (JP) ................................ 2024-008828

(51) Int. Cl.
*G06K 9/00* (2022.01)
*G06T 5/40* (2006.01)
(Continued)

(52) U.S. Cl.
CPC ................. *G06T 7/20* (2013.01); *G06T 5/40* (2013.01); *G06T 7/50* (2017.01); *G06T 7/62* (2017.01); *G06T 7/70* (2017.01); *G06V 10/44* (2022.01); *G06V 2201/07* (2022.01)

(58) Field of Classification Search
CPC .... G06T 7/20; G06T 5/40; G06T 7/50; G06T 7/62; G06T 7/70; G06T 7/246;
(Continued)

(56) References Cited

U.S. PATENT DOCUMENTS 5,680,514 A * 10/1997 Shams ...................... G01S 5/04 706/24
2006/0268111 A1* 11/2006 Zhang .................. G01S 3/7864 348/169

FOREIGN PATENT DOCUMENTS

| | | | |
|---|---|---|---|
| CN | 115797402 | A | 3/2023 |
| JP | H09181961 | A | 7/1997 |
| JP | 2014168126 | A | 9/2014 |
| JP | 2019125946 | A | 7/2019 |
| JP | 2022178493 | A | 12/2022 |
| WO | 2022213385 | A1 | 10/2022 |

OTHER PUBLICATIONS

CN115797402A English translation (Year: 2023).*
(Continued)

*Primary Examiner* — Duy M Dang
(74) *Attorney, Agent, or Firm* — Cowan, Liebowitz & Latman, P.C.

(57) ABSTRACT

An image processing apparatus comprises one or more memories storing instructions and one or more processors that execute the instructions to detect subjects from a frame, and if no subject having same identification information as identification information of a tracking target subject is detected from a first frame, and identification information of subjects detected from the first frame includes new identification information different from identification information of subjects detected from a second frame, which is a frame before a timing at which the tracking target subject is no longer detected, update the identification information of the tracking target subject to the new identification information.

14 Claims, 9 Drawing Sheets

(51) Int. Cl.

| | |
|---|---|
| ***G06T 7/20*** | (2017.01) |
| ***G06T 7/50*** | (2017.01) |
| ***G06T 7/62*** | (2017.01) |
| ***G06T 7/70*** | (2017.01) |
| ***G06V 10/44*** | (2022.01) |

(58) Field of Classification Search

CPC . G06T 2207/30196; G06T 2207/30201; G06T 2207/30244; G06V 10/44; G06V 2201/07; G06V 40/167

USPC .......................................................... 382/103

See application file for complete search history.

(56) References Cited

OTHER PUBLICATIONS

The above patent documents were cited in a European Search Report issued on Sep. 13, 2024, which is enclosed, that issued in the corresponding European Patent Application No. 24175980.2.

The above foreign patent document was cited in the May 30, 2025 Japanese Office Action, which is enclosed without an English Translation, that issued in Japanese Patent Application No. 2024-008828.

The above foreign patent documents were cited in an Oct. 27, 2025 Japanese Office Action, which is enclosed with a machine English Translation, that issued in Japanese Patent Application No. 2024-008828.

* cited by examiner

F I G. 1
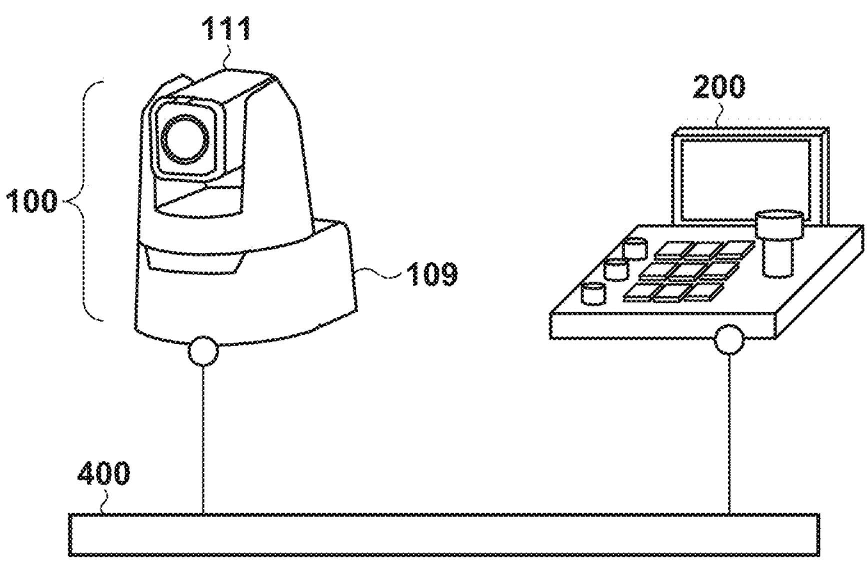

FIG. 2

F I G. 3B
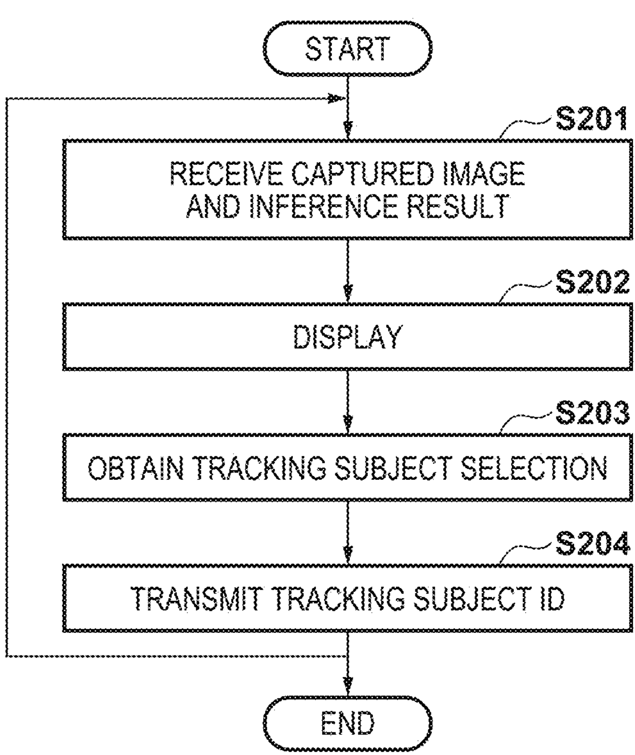

700
720
701
710
721
711
702
1
2

700
720
701
730
721
731
702
1
2

700
710
740
750
710a
740a 700
710
740
750
710a
740a 700
710
740
750
710a
740a

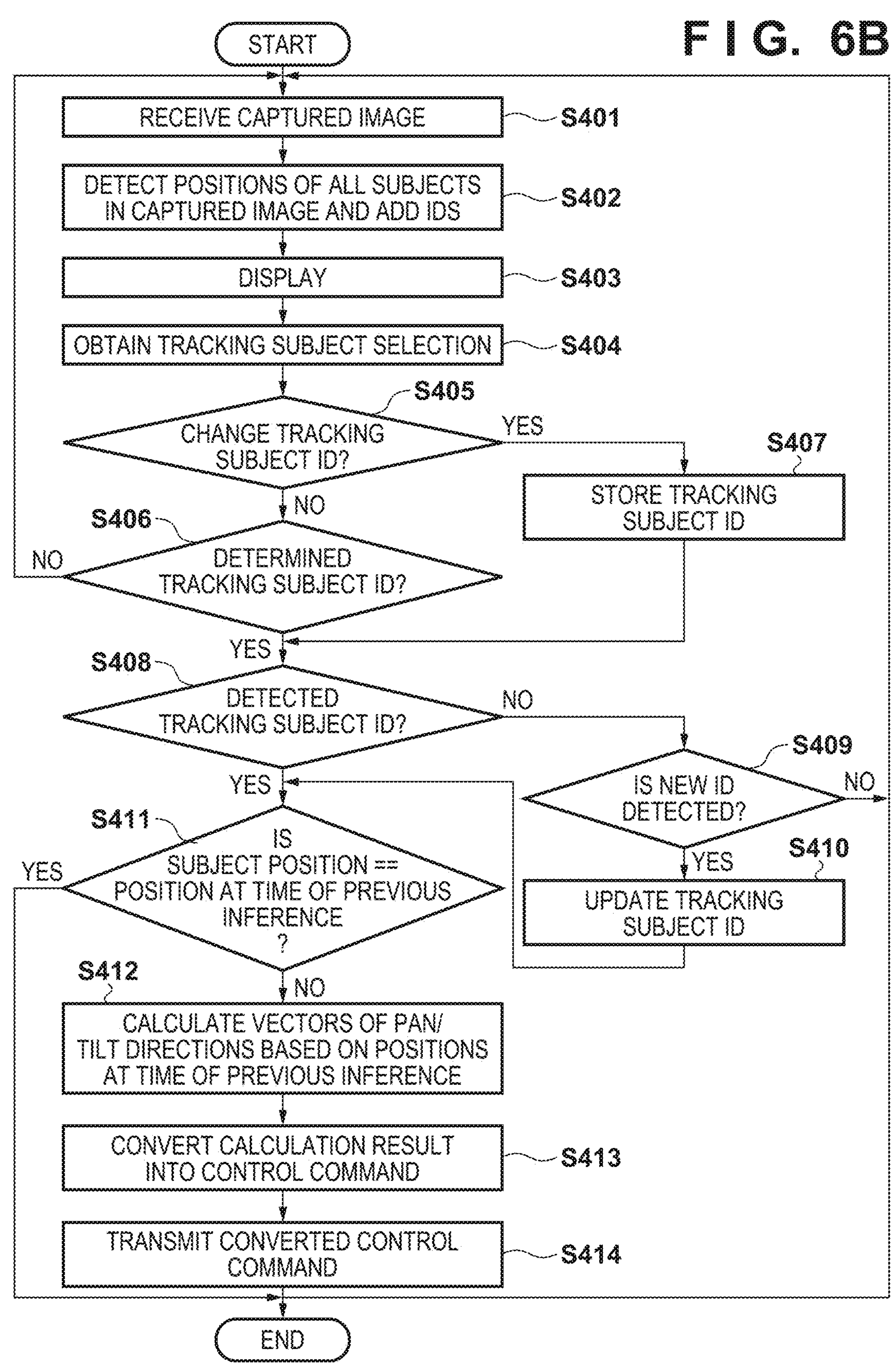

F I G. 6B
START
RECEIVE CAPTURED IMAGE
S401
DETECT POSITIONS OF ALL SUBJECTS IN CAPTURED IMAGE AND ADD IDS
S402
DISPLAY
S403
OBTAIN TRACKING SUBJECT SELECTION
S404
S405
CHANGE TRACKING SUBJECT ID?
YES
S407
STORE TRACKING SUBJECT ID
NO
S406
NO
DETERMINED TRACKING SUBJECT ID?
YES
S408
DETECTED TRACKING SUBJECT ID?
NO
S409
IS NEW ID DETECTED?
NO
YES
S410
UPDATE TRACKING SUBJECT ID
YES
S411
YES
IS SUBJECT POSITION == POSITION AT TIME OF PREVIOUS INFERENCE ?
S412
NO
CALCULATE VECTORS OF PAN/ TILT DIRECTIONS BASED ON POSITIONS AT TIME OF PREVIOUS INFERENCE
CONVERT CALCULATION RESULT INTO CONTROL COMMAND
S413
TRANSMIT CONVERTED CONTROL COMMAND
S414
END

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for tracking a subject.

Description of the Related Art

There is typically an automatic tracking technique in which a camera called a PTZ camera, which is capable of adjusting the pan, tilt, and zoom, automatically tracks a tracking target detected from a captured image in response to a user request. In the automatic tracking technique, the pan, tilt, and zoom are automatically controlled so that a tracking target is at a desired position within a field angle of the camera. Japanese Patent Laid-Open No. H09-181961 discloses a method for calculating control parameters of a PTZ camera required to display a tracking target at the center of a screen, based on the coordinates of the tracking target displayed on the screen.

The automatic tracking technique has a problem called "lost", in which a sight of a tracking target is lost when the tracking target crosses another object. If lost occurs, automatic tracking can no longer be continued normally.

SUMMARY OF THE INVENTION

The present invention provides a technique for enabling tracking of a tracking target subject to be continued even if the tracking target subject cannot be detected from a captured image.

According to the first aspect of the present invention, there is provided an image processing apparatus comprising one or more memories storing instructions and one or more processors that execute the instructions to: detect subjects from a frame; and if no subject having same identification information as identification information of a tracking target subject is detected from a first frame, and identification information of subjects detected from the first frame includes new identification information different from identification information of subjects detected from a second frame, which is a frame before a timing at which the tracking target subject is no longer detected, update the identification information of the tracking target subject to the new identification information.

According to the second aspect of the present invention, there is provided an image processing method performed by an image processing apparatus, the method comprising: detecting subjects from a frame; and if no subject having same identification information as identification information of a tracking target subject is detected from a first frame, and identification information of subjects detected from the first frame includes new identification information different from identification information of subjects detected from a second frame, which is a frame before a timing at which the tracking target subject is no longer detected, updating the identification information of the tracking target subject to the new identification information.

According to the third aspect of the present invention, there is provided a non-transitory computer-readable storage medium storing a computer program that causes a computer to execute the instructions to: detect subjects from a frame; and if no subject having same identification information as identification information of a tracking target subject is detected from a first frame, and identification information of subjects detected from the first frame includes new identification information different from identification information of subjects detected from a second frame, which is a frame before a timing at which the tracking target subject is no longer detected, update the identification information of the tracking target subject to the new identification information.

Further features of the present invention will become apparent from the following description of exemplary embodiments with reference to the attached drawings.

BRIEF DESCRIPTION OF THE DRAWINGS

FIG. 1 is a diagram showing an example of a configuration of a system.

FIG. 2 is a block diagram showing examples of hardware configurations of a camera 100 and a controller 200.

FIG. 3B is a flowchart of an operation of the controller 200.

FIG. 6B is a flowchart of an operation of the controller 200.

DESCRIPTION OF THE EMBODIMENTS

Figure 3A:
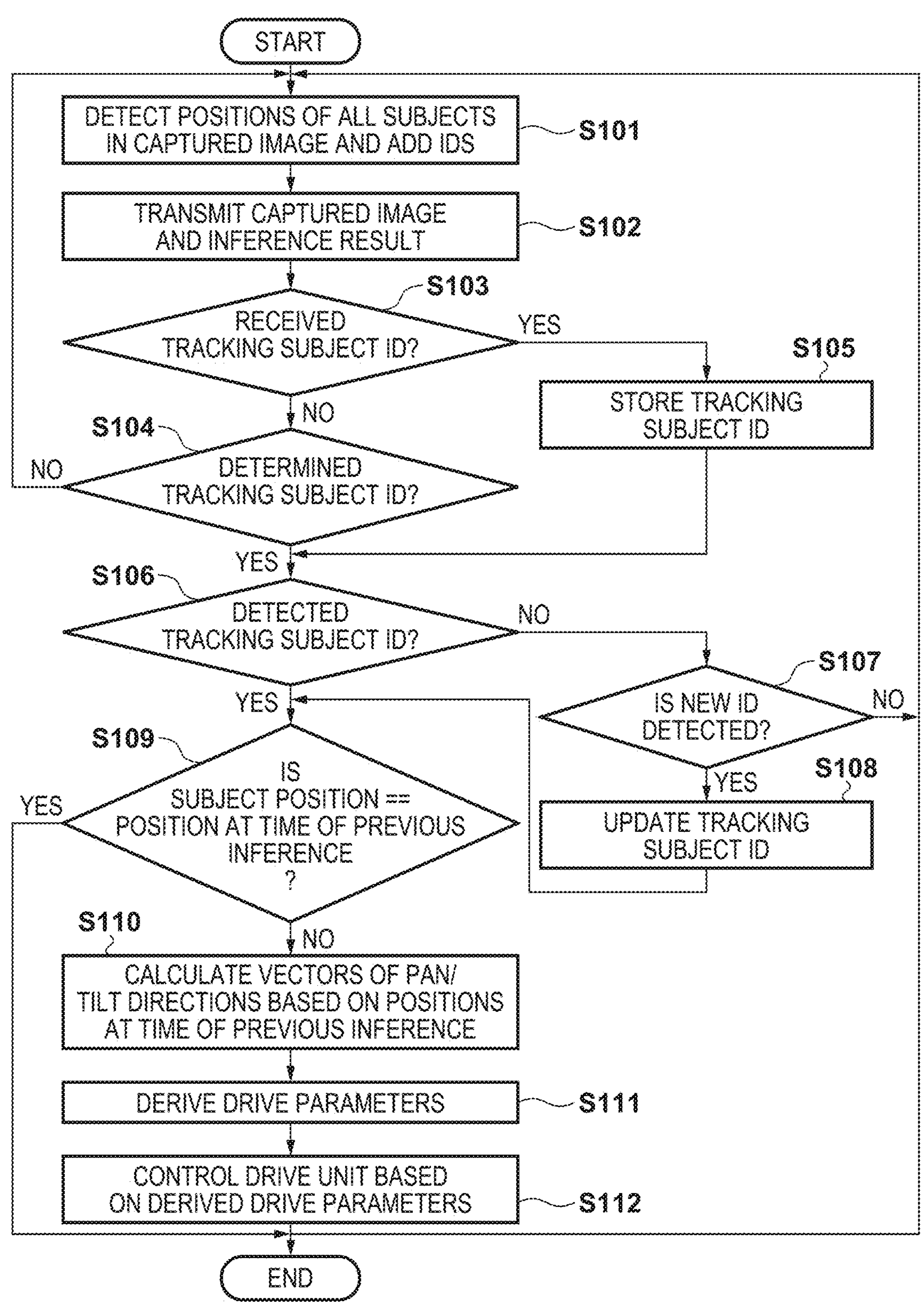
FIG. 3A is a flowchart of an operation of the camera 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The following will describe an example of a configuration of a system that tracks a tracking target subject designated by a user and captures an image thereof, with reference to FIG. 1. As shown in FIG. 1, the system according to the present embodiment includes a camera 100 having functions of tracking a subject and capturing an image thereof, and a controller 200 having functions of controlling the camera 100 and processing information from the camera 100. The camera 100 and the controller 200 are connected to a local area network (LAN) 400, and are configured to be able to communicate data to each other via the LAN 400. The LAN 400 may be a wired network or a wireless network. Also, the network between the camera 100 and the controller 200 is not limited to a specific network.

First, the camera 100 is described. The camera 100 is an image processing apparatus including an image capturing unit 111, and a drive unit 109 that controls the image capturing directions (pan and tilt directions) and the zoom of the image capturing unit 111.

When capturing a moving image, the image capturing unit 111 outputs images of frames as captured images, and when capturing a still image periodically or non-periodically, the image capturing unit 111 outputs a still image (a frame) as a captured image. The image capturing unit 111 transmits a captured image and various types of information to the controller 200 via the LAN 400. The drive unit 109 controls the image capturing direction (pan and tilt directions) and the zoom of the image capturing unit 111 so that the image capturing unit 111 tracks a subject set as a tracking target subject and captures an image thereof.

Then, the controller 200 is described. The controller 200 is configured to, for example, process various types of information transmitted from the camera 100, and notify the camera 100 of a tracking target subject selected by a user operation.

Figure 2:
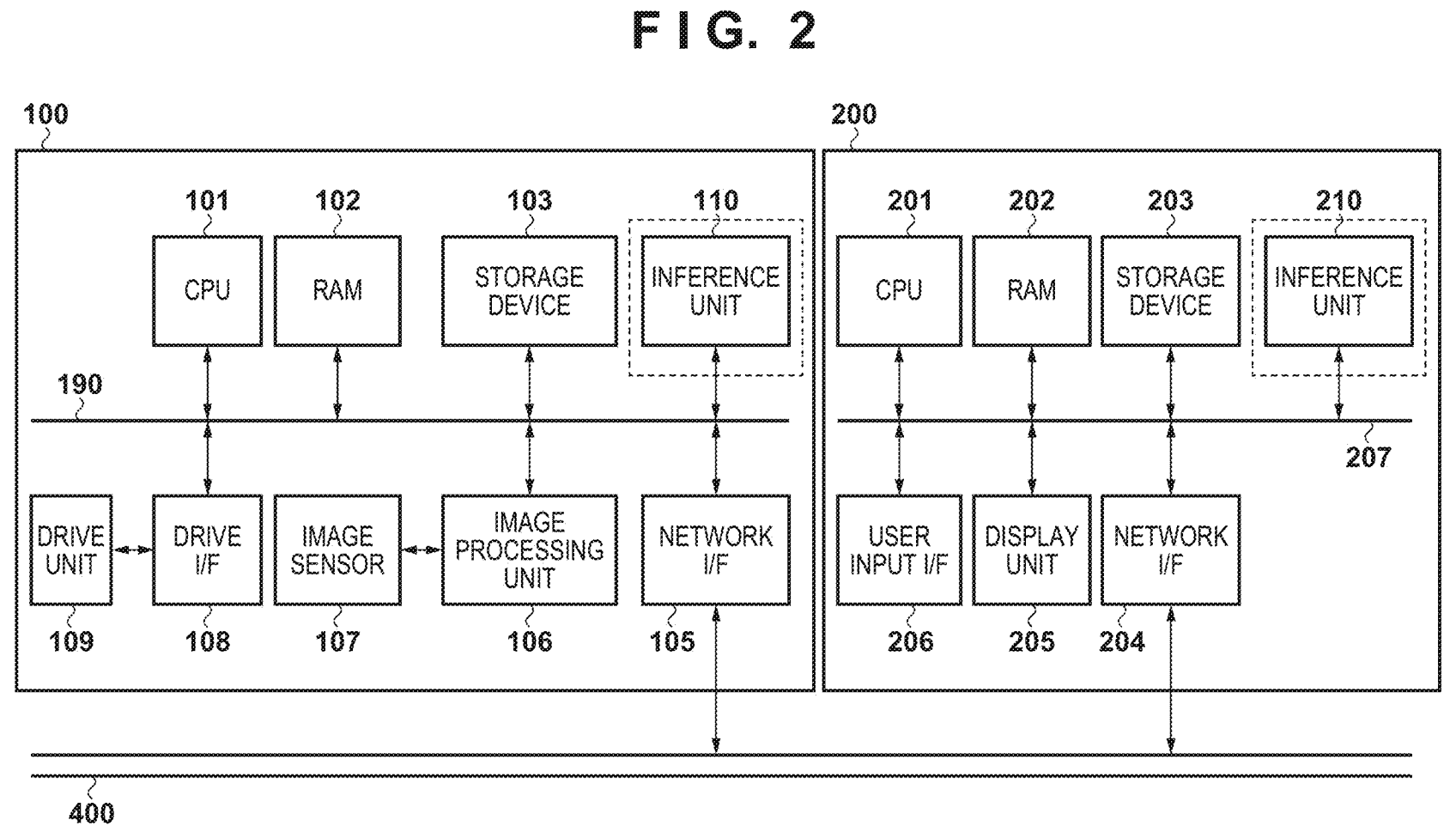

The following describes examples of hardware configurations of the camera 100 and the controller 200 with reference to the block diagram of FIG. 2. The configurations shown in FIG. 2 are merely examples of configurations that can execute various types of later-described processing, and changes/modifications are possible as appropriate.

First, an example of the hardware configuration of the camera 100 is described. A CPU 101 executes various types of processing using computer programs and data stored in a RAM 102. With this, the CPU 101 controls the overall operation of the camera 100, and executes or controls various types of processing that is described as processing executed by the camera 100.

The RAM 102 is an example of a high-speed storage device such as a DRAM. The RAM 102 has an area for storing a computer program and data loaded from a storage device 103, and an area for storing a captured image output from an image processing unit 106. The RAM 102 also has a work area for use when the CPU 101, an inference unit 110, and the image processing unit 106 execute various types of processing. In this way, the RAM 102 can provide various types of areas as appropriate.

The storage device 103 includes a volatile storage device such as a ROM, a flash memory, and an HDD, and a nonvolatile storage device. The storage device 103 has stored therein an operating system (OS), computer programs and data for causing the CPU 101, the inference unit 110, the image processing unit 106, and the like to execute or control various types of processing that is described as processing executed by the camera 100, and the like.

The inference unit 110 detects a subject from a captured image stored in the RAM 102 to infer the position of the subject, or infers whether or not there is any subject. The inference unit 110 is an arithmetic device, such as a graphics processing unit (GPU), specialized for image processing and inference processing. Typically, a GPU is advantageous for use in learning processing, but a reconfigurable logic circuit such as a field-programmable gate array (FPGA) may also be used to realize the same function. Also, the processing of the inference unit 110 may be executed by the CPU 101. Note that the inference unit 110 is used in the present embodiment but is not used in a later-described second embodiment, and thus the camera 100 does not need to include the inference unit 110 in the second embodiment.

The above-described drive unit 109 is connected to a drive I/F 108. The drive unit 109 includes a rotary mechanism for changing the image capturing direction or zoom of the camera 100, and also includes a mechanical drive system, a motor serving as a drive source, and the like. The drive unit 109 performs rotary operations such as pan/tilt operations and zoom operations for optically changing a field angle, in accordance with an instruction received from the CPU 101 via the drive I/F 108.

An image sensor 107 includes an optical system and an imaging sensor such as a CCD or CMOS, and the imaging sensor receives incident light having entered via the optical system and outputs an image based on the received light.

The image processing unit 106 converts the image output from the image sensor 107 into an image in a given image format, and outputs the converted image as a captured image. Note that the image processing unit 106 may also perform, on an image output from the image sensor 107, image quality adjustments such as color correction, exposure control, and sharpness correction, and crop processing for cutting out a predetermined region in the image, for example.

The camera 100 is connected to the LAN 400 via a network I/F 105, and the camera 100 performs communication with an external apparatus such as the controller 200 via a communication medium such as the Ethernet (registered trademark). Note that the communication may also be performed via another I/F such as a not-shown serial communication I/F.

The CPU 101, the RAM 102, the storage device 103, the inference unit 110, the drive I/F 108, the image processing unit 106, and the network I/F 105 are all connected to a system bus 190.

Then, the controller 200 is described. The controller 200 is a computer device such as a personal computer (PC), a tablet terminal device, or a smartphone.

A CPU 201 executes various types of processing using computer programs and data stored in a RAM 202. With this, the CPU 201 controls the overall operation of the controller 200, and executes or controls various types of processing that is described as processing executed by the controller 200 executes.

The RAM 202 has an area for storing a computer program and data loaded from a storage device 203, and a work area for use when the CPU 201 and an inference unit 210 execute various types of processing. The RAM 202 also has an area for storing various types of information received from the camera 100 via a network I/F 204. In this way, the RAM 202 can provide various types of areas as appropriate.

The storage device 203 includes a volatile storage device such as a ROM, a flash memory, and an HDD, and a nonvolatile storage device. The storage device 203 has stored therein an operating system (OS), computer programs and data for causing the CPU 201, the inference unit 210, and the like to execute or control various types of processing that is described as processing executed by the controller 200 executes, and the like.

The inference unit 210 has the same function as the above-described functions of the inference unit 110. Note that the inference unit 210 is not used in the present embodiment but is used in the later-described second embodiment, and thus the controller 200 does not need to include the inference unit 210 in the present embodiment.

A user input I/F 206 is a user interface such as a keyboard, a mouse, a touch panel screen, a joy stick, a button, or a dial, and a user can operate the user input I/F 206 to input various types of information and instructions to the controller 200.

A display unit 205 has a liquid crystal screen or a touch panel screen, and can display processing results obtained by the CPU 201 and the inference unit 210 with images, text, and the like. Note that the display unit 205 is not limited to a device included in the controller 200, and may be an external apparatus connected to the controller 200 in a wired or wireless manner. Also, the display unit 205 may be a projection device such as a projector that projects an image and text.

The controller 200 is connected to the LAN 400 via the network I/F 204, and the controller 200 performs communication with an external apparatus such as the camera 100 via a communication medium such as the Ethernet (registered trademark). Note that the communication may also be performed via another I/F such as a not-shown serial communication I/F.

The CPU 201, the RAM 202, the storage device 203, the inference unit 210, the user input I/F 206, the display unit 205, and the network I/F 204 are all connected to a system bus 207.

The following describes the operation of the camera 100 with reference to the flowchart in FIG. 3A. The processing according to the flowchart in FIG. 3A is processing for a captured image of one frame, and the camera 100 actually performs the processing of the flowchart in FIG. 3A for captured images of frames.

In step S101, the image processing unit 106 generates a captured image in a manner as described above in response to an instruction from the CPU 101, and stores the generated captured image in the RAM 102. Also, the CPU 101 inputs the captured image to the inference unit 110, and the inference unit 110 generates an inference result for the captured image in response to an instruction from the CPU 101, and stores the generated inference result to the RAM 102.

The inference unit 110 reads a trained model generated using machine learning such as deep learning from the storage device 103. Also, by inputting the captured image to the trained model to perform calculation (inference) of the trained model, the inference unit 110 obtains the position of a subject in the captured image as the inference result of the subject. If the captured image contains a plurality of subjects, the inference unit 110 acquires an inference result for each of the subjects. Note that to improve the inference processing speed, a configuration is also possible in which the image processing unit 106 reduces the size of a captured image, stores the size-reduced image to the RAM 102, and inputs the size-reduced image to the trained model.

Also, the CPU 101 adds an ID, which is identification information unique to a subject, to the inference result of the subject. If the captured image contains a plurality of subjects, the CPU 101 adds, to the inference result of each of the subjects, an ID unique to the corresponding subject.

Figures 4A, 4B, 4C, 4D, 4E:
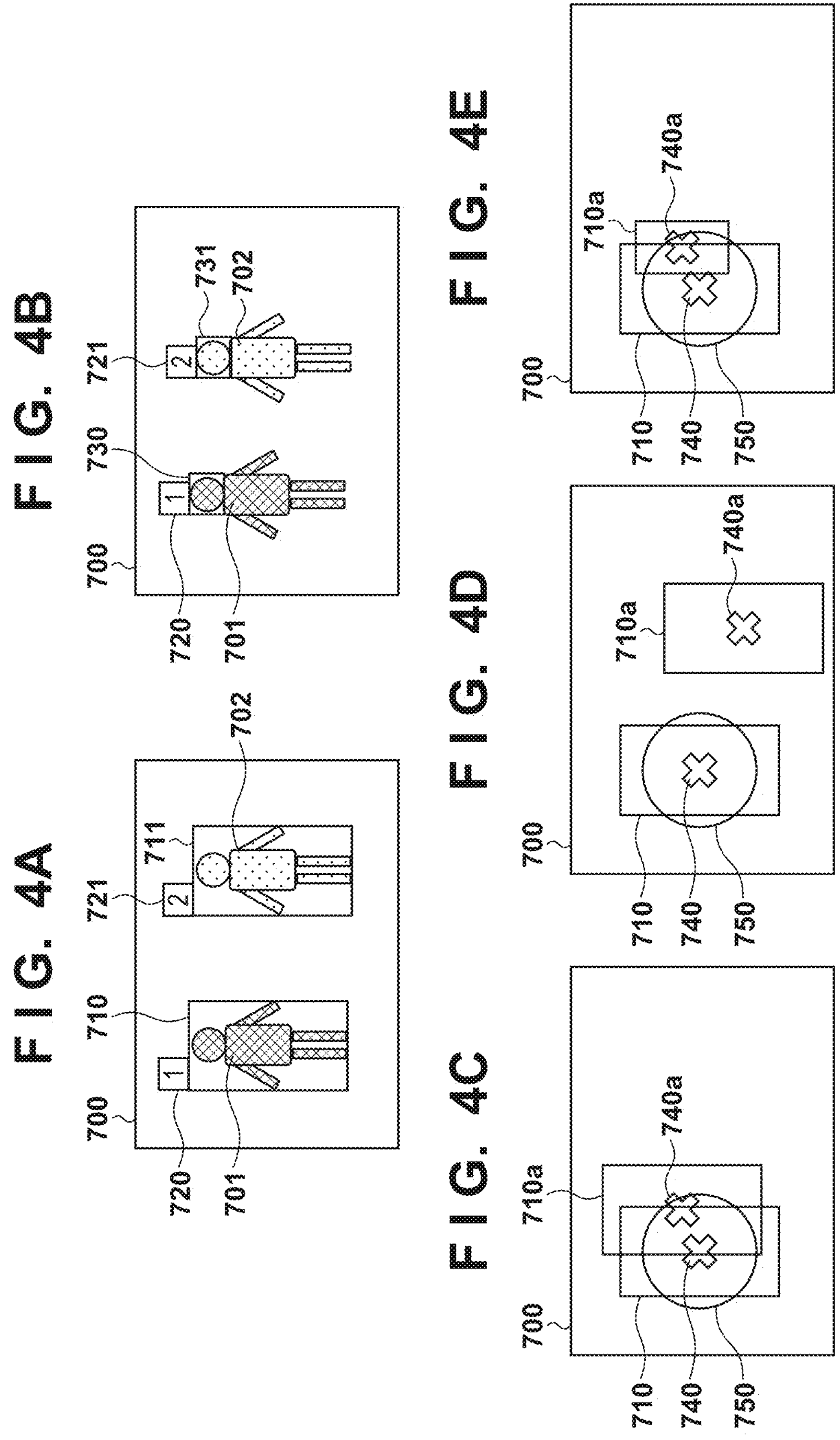
FIGS. 4A to 4H are diagrams showing examples of inference results.

Here, an inference result is described with reference to FIGS. 4A to 4E. In FIGS. 4A to 4H, it is assumed that subjects are persons. FIG. 4A is a diagram showing an inference result when two persons (persons 701 and 702) are contained in a captured image 700. Upon input of the captured image 700 of FIG. 4A to the inference unit 110, the inference unit 110 outputs "the image coordinates of the upper left vertex and the image coordinates of the lower right vertex of a rectangle 710 containing the entire person 701" as the position of the person 701 (inference result of the person 701), and outputs "the image coordinates of the upper left vertex and the image coordinates of the lower right vertex of a rectangle 711 containing the entire person 702" as the position of the person 702 (inference result of the person 702).

Also, the CPU 101 adds "1" as an ID 720, which is identification information unique to the person 701, to the inference result of the person 701, and adds "2" as an ID 721, which is identification information unique to the person 702, to the inference result of the person 702.

Note that the position of a person that is output by the inference unit 110 is not limited to the image coordinates of the upper left vertex and the image coordinates of the lower right vertex of a rectangle containing the entire person. For example, as shown in FIG. 4B, the inference unit 110 may output the image coordinates of the upper left vertex and the image coordinates of the lower right vertex of a rectangle 730 containing the head of the person 701 as the position of the person 701, and the image coordinates of the upper left vertex and the image coordinates of the lower right vertex of a rectangle 731 containing the head of the person 702 as the position of the person 702. Also, the inference unit 110 may output, as the position of a person, the image coordinates of the upper left vertex and the image coordinates of the lower right vertex of a rectangle containing another part of the person. Also, instead of the image coordinates of the upper left vertex and the image coordinates of the lower right vertex of a rectangle, the inference unit 110 may output the image coordinates of the center of the rectangle and the width and height of the rectangle.

Note that, in order to detect, instead of a person, another object such as a head or a face, the used trained model need only be changed to a trained model trained based on training data corresponding to a desired output.

Although a case in which a subject is detected using a trained model generated by a machine learning method has been described, the method for detecting a subject is not limited to a specific method. It is also possible to use, for example, a method such as a SIFT method of detecting a subject by comparing local features in a captured image, or a method such as a template matching method of detecting a subject by obtaining a degree of similarity with a template image.

Also, adding an ID to an inference result is performed for each frame by the CPU 101 based on the current inference result. At this time, the CPU 101 compares an inference result of a previous frame with an inference result of the current frame, and adds an ID in a manner such that the same ID is assigned to the same subject even when the subject is moved. Specifically, a method may also be used in which the positions and sizes of detected rectangles are compared between the current frame and the previous frame, and the same ID is added to the closest subjects.

The following describes how to add an ID to an inference result with reference to FIGS. 4C to 4E. FIGS. 4C to 4E show information necessary for the following description, namely, the rectangle 710 containing the entire person 701 detected from a previous frame, a center 740 of the rectangle 710, a rectangle 710*a* containing the entire person 701 detected from the current frame, a center 740*a* of the rectangle 710*a*, and a circle 750 with a radius L1 about the center 740. Information other than the above-described information are omitted.

L1 is stored in advance as a parameter in the storage device 103. If the center of a rectangle B of a subject B in the current frame is located within a distance L1 from the central position of a rectangle A of a subject A in the previous frame, and the ratio (area ratio) of the area (number of pixels) of the rectangle A to the area (number of pixels) of the rectangle B is within a predetermined range X (e.g., 0.9 to 1.1), the CPU 101 determines that the subject B is identical to the subject A, and adds, to the inference result of the subject B, the same ID as the ID added to the inference result of the subject A. The predetermined range X is stored in advance as a parameter in the storage device 103.

In the example shown in FIG. 4C, the center 740*a* of the rectangle 710*a* is located within the distance L1 (i.e., within the circle 750) from the center 740 of the rectangle 710 in the previous frame, and the ratio of the area (number of pixels) of the rectangle 710 to the area (number of pixels) of the rectangle 710*a* is within the predetermined range X. Accordingly, the CPU 101 adds, to the inference result of the person corresponding to the rectangle 710*a*, the same ID as the ID added to the inference result of the person corresponding to the rectangle 710.

In the example shown in FIG. 4D, the center 740*a* of the rectangle 710*a* is not located within the distance L1 (i.e., within the circle 750) from the center 740 of the rectangle 710 in the previous frame. Accordingly, the CPU 101 adds, to the inference result of the person corresponding to the rectangle 710*a*, a new ID different from the ID added to the inference result of the person corresponding to the rectangle 710.

In the example shown in FIG. 4E, the center 740*a* of the rectangle 710*a* is located within the distance L1 (i.e., within the circle 750) from the center 740 of the rectangle 710 in the previous frame, but the ratio of the area (number of pixels) of the rectangle 710 to the area (number of pixels) of the rectangle 710*a* is not within the predetermined range X. Accordingly, the CPU 101 adds, to the inference result of the person corresponding to the rectangle 710*a*, a new ID different from the ID added to the inference result of the person corresponding to the rectangle 710. Also, the CPU 101 may add the same ID to objects for which a change in aspect ratio of the rectangle between a previous frame and the current frame is within a threshold Y.

It is also possible to use a method in which the position of a rectangle of the current frame is estimated based on a transition of the positions of rectangles corresponding to the same ID in multiple previous frames using a Kalman filter or the like, and the same ID as this ID is added to the inference result of a person corresponding to the rectangle closest to the estimated position of the rectangle.

It is also possible to use a method in which a feature amount A of an image within a rectangle for an object detected in the current frame is obtained, the feature amount A is compared with feature amounts B of images within respective rectangles for objects detected in previous frames, and the same ID as the ID added to the inference result of a person of the rectangle having the feature amount B closest to the feature amount A is added to the inference result of the person A.

The following describes a case where a feature vector of an image is used as a feature amount. First, a machine learning model is prepared that has been trained so as to output similar feature vectors to images of a specific person viewed at different angles, and output feature vectors different from those feature vectors to images of a different person. Specifically, images of various subjects captured in advance at various angles are prepared as training images, and images of the same subject are labeled with the same ID and are input to the machine learning model. Feature vectors output from the images are outputs. Training is performed with deep metric learning using a feature vector space in which the feature vectors output from the training images are mapped. In deep metric learning, the distance between two feature amounts reflects the degree of similarity of data, and training is performed so that the distance between feature amounts output from input images close in meaning is small, and the distance between feature amounts output from input images farther away in meaning is large. The loss function used in deep metric learning for calculating a distance includes a triplet loss, a contrastive loss, a classification error, and the like. When captured images of the same subject captured at different angles are input to a machine learning model trained in this way, similar feature vectors are to be output as an inference result. Note that any loss function may be used as long as it is defined so that a loss is reduced as input images are closer in meaning. Note that although an example in which deep metric learning is used has been described, the present invention is not limited thereto, and the present invention is executable using any method as long as it is a training method for enabling a group of feature vector data to be divided into a group of feature vectors of captured image of the same subject and a group of feature vectors of captured images of different subjects.

Also, the feature amount for use in adding an ID are not limited to this, and a method is also applicable in which color information of an image in a rectangle of the current frame is obtained, the acquired information is compared with color information in rectangles of previous frames, and the same ID is added to the closest persons. Specifically, color information is obtained by calculating an average of pixel values at a given percentage of positions in a rectangle or an average of pixel values of a given region in the rectangle. Alternatively, an average of the entire rectangle may be calculated, and if, for example, persons are in the same uniform in their upper bodies, an average of pixel values in lower regions of rectangles may be calculated for example, so that colors of regions in which a difference in the skin or clothing of subjects is noticeable can be obtained. A configuration is also possible in which a histogram of the entire rectangle or a given region is obtained as color information, the obtained histogram is compared with histograms of rectangles in previous frames using the Pearson's correlation function, chi-square test, or the like, and the same ID is added to persons having the highest degree of similarity.

Also, a threshold may be set for a difference in feature amount (in the above-described example, a difference between the feature amount A and the feature amount B) used to add the same ID. In this case, if the difference between the feature amount A and the feature amount B closest to the feature amount A is less than or equal to the threshold, the CPU 101 adds, to the inference result of the person A, the same ID as the ID added to the inference result of a person in the rectangle of the feature amount B.

Also, a configuration is possible in which a machine learning model trained so as to output similar feature amounts to images of a specific person viewed at different angles and output a feature amount different from them to an image of a different person is used to obtain feature amounts. Also, these methods may be used in combination to add an ID.

In step S102, the CPU 101 reads the captured image and the inference result (including IDs of the inference result) stored in the RAM 102 as transmission information, and transmits the read transmission information to the controller 200 via the network I/F 105.

In step S103, the CPU 101 determines whether or not "the ID of a tracking target subject (tracking subject ID)" has been received from the controller 200 via the network I/F 105. As a result of the determination, if it is determined that the tracking subject ID has been received from the controller 200, the procedure moves to step S105, and if it is determined that no tracking subject ID has been received from the controller 200, the procedure moves to step S104.

In step S104, the CPU 101 determines whether or not any determined tracking subject ID is stored in the RAM 102 (whether or not any tracking subject ID has been determined). As a result of the determination, if it is determined that any determined tracking subject ID is stored in the RAM 102 (any tracking subject ID has been determined), the procedure moves to step S106. On the other hand, if it is determined that no determined tracking subject ID is stored in the RAM 102 (no tracking subject ID has been determined), the procedure moves to step S101.

For example, if a default (e.g., NULL) is set for the tracking subject ID stored in the RAM 102, the CPU 101 may determine that no determined tracking subject ID is stored in the RAM 102 (no tracking subject ID has been determined). In this case, if a value other than the default is set for the tracking subject ID stored in the RAM 102, the CPU 101 determines that any determined tracking subject ID is stored in the RAM 102 (any tracking subject ID has been determined).

In step S105, the CPU 101 stores the tracking subject ID received from the controller 200 via the network I/F 105, in the RAM 102. In step S106, the CPU 101 determines whether or not there is an inference result with the same ID as the tracking subject ID, among the inference results that have been stored in the RAM 102 in step S101 (inference results of subjects detected from the captured image of the current frame). In other words, the CPU 101 determines whether or not the subject corresponding to the same ID as the tracking subject ID has been detected from the captured image of the current frame.

As a result of the determination, if it is determined that, among the inference results of subjects detected from the captured image of the current frame, there is an inference result with the same ID as the tracking subject ID (a subject corresponding to the same ID as the tracking subject ID has been detected), the procedure moves to step S109.

On the other hand, if it is determined that, among the inference results of subjects detected from the captured image of the current frame, there is no inference result with the same ID as the tracking subject ID (no subject corresponding to the same ID as the tracking subject ID has been detected), the CPU 101 determines that the tracking target subject is lost, and stores the current time T in the RAM 102. Then, the procedure moves to step S107. The current time is obtained using the timer function of the CPU 101. Note that the CPU 101 may also store, in addition to or instead of the current time, information defining the timing at which the tracking target subject is lost, such as the frame number of the current frame or a time stamp.

Figures 4F, 4G, 4H:
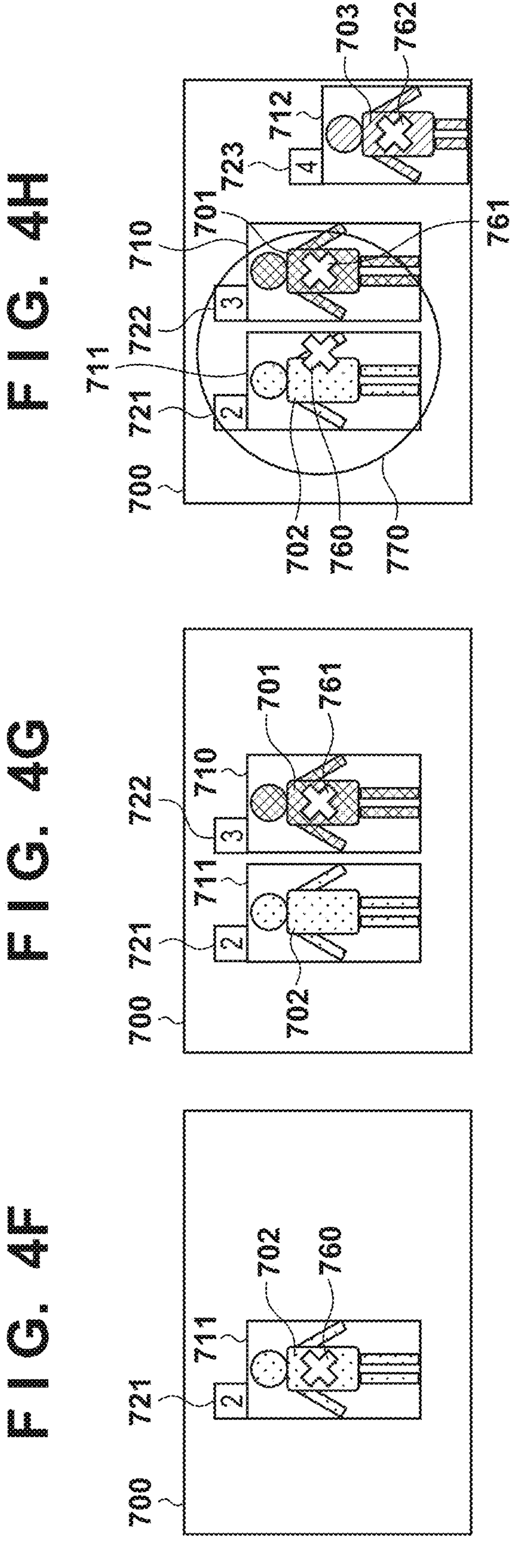

The following describes examples of the states of subjects contained in captured images at that time with reference to FIGS. 4A and 4F. Here, a case where the tracking subject ID=1 (in other words, the tracking target subject is the person 701) is described.

When, after the state in FIG. 4A, for example, the person 701 and the person 702 are moved and the person 702 passes in front of and crosses the person 701 (on the camera 100 side), the person 701 in the captured image 700 is behind the person 702 as shown in FIG. 4F, and is no longer visible (in a state where the person 701 is lost). As a result, no tracking subject ID is obtained from the captured image 700 in FIG. 4F. In this case, the procedure moves from step S106 to step S107.

In step S107, the CPU 101 obtains, from "the inference results of subjects detected from frames" stored in the RAM 102, IDs of the inference results of subjects detected from the current frame, and IDs of the inference results of subjects detected from a frame before a time T (before the above-described timing). Then, the CPU 101 determines whether or not the IDs of the inference results of subjects detected from the current frame include any new ID different from the IDs of the inference results of subjects detected from the frame before the time T.

As a result of the determination, if it is determined that the IDs of the inference results of subjects detected from the current frame include any new ID different from the IDs of the inference results of subjects detected from the frame before the time T, the procedure moves to step S108. On the other hand, if it is determined that the IDs of the inference results of subjects detected from the current frame do not include any new ID different from the IDs of the inference results of subjects detected from the frame before the time T, the procedure moves to step S101.

The following describes examples of the states of subjects contained in captured images at that time with reference to FIGS. 4A, 4F, and 4G. It is assumed, for example, that the captured image 700 in FIG. 4F is the current frame, and the captured image 700 in FIG. 4A is the frame before the time T. At that time, only the inference result "ID=2" is obtained from the captured image 700 in FIG. 4F, and the inference result "ID=1, 2" is obtained from the captured image 700 in FIG. 4A. Accordingly, there is no new ID. In this case, the procedure moves from step S107 to step S101.

On the other hand, when the person 701 and the person 702 are further moved from the state in FIG. 4F and the crossing is complete, the person 701 appears again as shown in FIG. 4G. From the inference unit 110 to which the captured image 700 in FIG. 4G has been input, an inference result of the person 701 and an inference result of the person 702 are output. Here, there may be a situation where not the same ID as the ID of the inference result of the person before the crossing but a new ID is added to the person after the crossing, resulting in a situation in which the tracking target subject is lost. In the example in FIG. 4G, as a result of inference for the captured image 700, a new ID 722 (ID=3), instead of the same ID as the ID (ID=1) of the inference result of the person 701 before the crossing, is added to the inference result of the person 701 after the crossing.

The inference result obtained from the captured image 700 in FIG. 4G is "ID=2, 3", and the inference result obtained from the captured image 700 in FIG. 4A is "ID=1, 2". Accordingly, ID 3 is a new ID. In this case, the procedure moves from step S107 to step S108.

Examples of a case where a new ID is added include a case where the position of a subject immediately before being lost and the position of the subject appearing again are apart from each other, and a case where the orientation, pose and the like of a subject are changed after crossing, and a change in size of rectangle of the subject between before and after the lost is large. A further example of the case where a new ID is added is a case where the orientation of a subject and the direction of outside light are changed after crossing, and a change in the feature amount such as color information between before and after the lost is large.

Note that the determination method in step S107 is not limited to a specific determination method. For example, the CPU 101 may store the ID of the inference result of a subject detected in the frame where lost has occurred, in the RAM 102. Then, the CPU 101 may determine whether or not the IDs of inference results of subjects detected from the current frame include a new ID different from the IDs of the inference results of subject stored in the RAM 102. For example, the CPU 101 may store the ID of the inference result of the subject detected from the captured image 700 (frame where lost has occurred) in FIG. 4F in the RAM 102, and may determine whether or not the IDs of the inference results of the subjects detected from the captured image 700

(current frame) in FIG. 4G include any new ID different from ID stored in the RAM 102.

As a result of such determination, if it is determined that the IDs of the inference results of subjects detected from the current frame include any new ID different from the ID stored in the RAM 102, the procedure moves to step S108.

On the other hand, if it is determined that the IDs of the inference results of subjects detected from the current frame do not include any new ID different from the ID stored in the RAM 102, the procedure moves to step S101.

In step S108, the CPU 101 updates the tracking subject ID stored in the RAM 102 to the new ID. In the captured image 700 in FIG. 4G, the new ID of 3 is included, and thus in this case, the CPU 101 updates the tracking subject ID to "3".

If lost occurs due to crossing, an ID newly added after the time at which the lost has occurred is highly likely to be the tracking subject ID before the lost, and it is thus possible to restart tracking of the subject present in the captured image by updating the tracking subject ID to the new ID.

Note that, before executing the processing in step S108, the CPU 101 may also determine whether or not to update the tracking subject ID to the new ID based on the position of the subject corresponding to the new ID. The following describes an example thereof with reference to FIGS. 4A to 4H.

As shown in FIG. 4H, the CPU 101 sets a circle 770 with a diameter L2 about the position (position 760 in FIG. 4F) of the lost subject. The method for obtaining the position of the lost subject is not limited to a specific method. For example, a position obtained by adding a motion vector of a tracking target subject in a frame immediately before the lost to the position of the tracking target subject in the frame immediately before the lost may be obtained as the position of the lost subject. Also, the position of a subject behind which the lost subject is located may be obtained as the position of the lost subject. L2 is stored in advance as a parameter in the storage device 103. Also, if the position of the subject corresponding to the new ID is within the circle 770, the CPU 101 determines to update the tracking subject ID to the new ID and executes the processing in step S108.

For example, as shown in FIG. 4H, when the person 701 appears again after crossing and another person 703 enters the screen from the outside of the field angle, the new IDs are added to not only the inference result of the person 701 but also the inference result of the person 703. In FIG. 4H, a new ID 723 (ID=4) is added to the inference result of the person 703. In this case, the CPU 101 obtains a distance D1 between a position 761 of the person 701 and the position 760, and a distance D2 between a position 762 of the person 703 and the position 760. As a result, the position 761 of the person 701 is located inside the circle 770 (D1<L2), and the position 762 of the person 703 is located outside the circle 770 (D2>L2). Therefore, the CPU 101 updates the tracking subject ID to the new ID=3 added to the inference result of the person 701, rather than the new ID=4 added to the inference result of the person 703. Since, in this way, the tracking subject ID is not updated to the ID of a subject appearing at a distance apart from the position at which the subject has been lost, appropriate tracking is possible.

Note that it has been described that the tracking subject ID is updated to the ID of a subject appearing within a range (threshold range) of the circle with the radius L2 from the position at which the subject has been lost, but the threshold range is not limited to this. For example, the shape of the threshold range is not limited to a circular shape, and may be a rectangular shape or an asymmetric shape.

Also, the value of L2 is not constant, and may be dynamically varied each time lost occurs. For example, the value of L2 may be determined based on the size of a rectangle of an inference result before a tracking target subject is lost. A configuration is also possible in which by configuring settings such that the value of L2 increases with an increase in the size of a rectangle, the tracking subject ID is updated as appropriate even when lost occurs.

Also, the value of L2 may be determined based on, for example, a moving speed of a rectangle of a tracking target subject calculated from the moving distance of the rectangle before the tracking target subject is lost. Specifically, a configuration is also possible in which by configuring settings such that the value of L2 increases with an increase in the speed, the tracking subject ID is updated as appropriate even when lost occurs.

Also, for example, the shape of the threshold range may be changed by calculating the moving direction of a rectangle of an inference result before the tracking target subject is lost. Specifically, if a tracking subject is moved to the right in a captured image before the occurrence of lost, a threshold range may be set in a shape in which the right side of the position at which the lost has occurred is larger than the left side.

With this measure, the tracking subject ID is appropriately updated while preventing an incorrect tracking subject ID from being updated. Also, for example, the value of L2 may be determined based on an elapsed time from when lost has occurred. A configuration is also possible in which by configuring settings such that the value of L2 increases with an increase in the elapsed time from when lost has occurred, the tracking subject ID is appropriately updated even when the subject has crossed a large object and has been lost. Thus, even when a tracking subject has been lost, it is possible to continue appropriate tracking of the tracking subject by updating the tracking subject ID to a new ID.

Also, if the feature amount for the ID newly added in step S108 is close to the feature amount of the tracking subject before the occurrence of lost, the tracking subject ID may be updated using the newly added ID as a new tracking subject ID.

When a feature vector is used as a feature amount, feature vectors of all of the subjects are stored in the RAM 102 in step S101. Calculation of a feature vector is performed by the method described with reference to step S101. If the tracking subject ID is detected in step S106, the feature vector of the subject with the tracking subject ID is stored in the RAM 102. If a difference between the feature vector of the subject with the ID newly added in step S108, and the feature vector of the tracking subject read from the RAM 102 is within a threshold, the tracking subject ID is updated to the newly added ID.

Also, the orientation of a face or body may be used as a feature amount. If the orientation of the face or body of an object with the ID newly added in step S108 is close to the orientation of the face or body of the tracking subject before the occurrence of lost, the tracking subject ID may be updated using the newly added ID as a new tracking subject ID. A trained model trained using images of the faces and bodies of persons and the orientations of the faces and bodies in the images (four divisions, namely, forward, rightward, leftward, and backward orientations) as teaching data is prepared. The orientations of the faces and bodies may include finer orientations, namely, eight divisions including, in addition to the above-described orientations, a diagonally backward right orientation, and the like. Also, the orientations of the faces and bodies may be given as any of 0 degrees to 359 degrees with the front orientation being 0 degrees. The finer the orientations are given, the finer orientations as inference results will also be obtained. When an image in which the face or body of a person is appearing is input to this trained model, the orientations of subjects can be obtained as inference results. Specifically, the orientations of the bodies and faces of all subjects are obtained in advance in step S101, and if the tracking subject ID is detected in step S106, the orientation of the subject with the tracking subject ID is stored in the RAM 102. If the orientation of the subject with the ID newly added in step S108 is identical to the orientation of the tracking subject ID read from the RAM 102, the tracking subject ID is updated to the newly added ID. A trained model that outputs, from an image of a subject, the positions of parts of the body such as the nose, mouth, eyes, ears, and arms may be prepared, and the orientation of the face or body may be determined based on the number of the parts and the positional relationship thereof obtained as a result of inference. For example, when only one of the eyes and one of the ears are recognized in the rectangle of the recognized subject, and the nose is located on the left side, the orientation of the subject is determined as the laterally left orientation. The determination method is not limited to this.

Because, during crossing, one subject is often moving in one direction and passing by another subject, by such processing, the one subject ID is appropriately updated based on the orientation of the face or body of the one subject even after lost has occurred. As described above, in a case where a trained model is used that outputs finer orientations and angles for the orientations of faces or bodies, if the orientation of a lost tracking subject and the orientation of a subject with a newly added ID are within a threshold value, the tracking subject ID may be updated to the newly added ID. For example, in a case where the orientations obtained by dividing all the orientations into eight divisions are output, if the orientation of the lost tracking subject is the diagonally forward right orientation, or the orientation of a subject with a newly added ID is any one of the rightward orientation, the diagonally forward right orientation, and the downward orientation, the tracking subject ID may be updated to the newly added ID. For example, in a case where the orientations expressed in any one 0 degrees to 359 degrees are output, if the orientation of the lost subject is 35 degrees, or the orientation of the subject with a newly added ID is within a range from 25 degrees to 45 degrees, that is, within a range of +10 degrees of the orientation of the subject, the tracking subject ID may be updated to the newly added ID. By setting a wide range of conditions for updating the ID, a slight change in the orientation of a tracking subject after lost can be covered in a robust manner.

Also, instead of the orientation of the face or body, attributes such as the pose or body shape of a subject may be used as a feature amount. A trained model that has learned attributes such as the poses and body shapes of subjects may also be prepared, and if the attribute of the tracking subject before the occurrence of lost is close to the attribute of the object with the ID newly added in step S108, the tracking subject ID is updated using the newly added ID as the new tracking subject ID. Specifically, with respect to the pose, a trained model is prepared that has been trained with captured images and the inclination angles of body portions as teaching data, and outputs the inclination angles of body portions based on captured images. With respect to the body shape, a trained model is prepared that has been trained with captured images and numeric values numerically expressing the degrees of roundness as teaching data, and outputs degrees of roundness based on captured images. When such a trained model is used, objects whose poses are close to each other or objects whose body shapes are close to each other, between before and after lost are recognized. When such processing is performed, the tracking subject ID is appropriately updated even when lost has occurred, taking into consideration features of the tracking target subject before and after the occurrence of the lost.

Also, the size or aspect ratio of a detected rectangle may be used as a feature amount. A configuration is also possible in which if the area or aspect ratio of the rectangle of the subject recognized in step S101, that is, the tracking subject before the occurrence of lost, and the size or aspect ratio of the rectangle of the object with the newly added ID in step S108 are close to each other, the tracking subject ID may be updated using the newly added ID as the new tracking subject ID. When such processing is performed, the tracking subject ID is appropriately updated even when lost has occurred, taking into consideration features with respect to the size of the tracking target subject before and after the occurrence of the lost.

Also, the color of a subject may be used as a feature amount. If the color of the body for the ID newly added in step S108 is close to the color of the body of the tracking subject before the occurrence of lost, the tracking subject ID may be updated using the newly added ID as a new tracking subject ID. The color of the body can be obtained by calculating an average of pixel values at a given percentage of positions in a rectangle output by the inference unit 110 or an average of pixel values of a given region in the rectangle. Specifically, the colors of the bodies of all subjects are obtained in advance in step S101, and if the tracking subject ID is detected in step S106, the color of the subject with the tracking subject ID is stored in the RAM 102. If a difference between the color of the subject with the ID newly added in step S108, and the color of the tracking subject read from the RAM 102 is within a threshold, the tracking subject ID is updated to the newly added ID. To obtain the color of a body, an average of the entire rectangle output by the inference unit 110 may be calculated, and if, for example, persons are in the same uniform in their upper bodies, an average of pixel values in lower regions of rectangles may be calculated for example, so that colors of regions in which a difference in the skin or clothing of subjects is noticeable can be obtained. Also, a histogram of the entire rectangle or a given region may be obtained as information on the color of the body. In this case, a histogram of the subject with the newly added ID is compared with a histogram of the tracking subject before the occurrence of lost using the Pearson's correlation function, chi-square test, or the like, and the ID is updated if they have a high degree of similarity. With such processing, the tracking subject ID is appropriately updated even when lost has occurred, taking into consideration features of the body of the tracking target subject or the color of the clothing. Also, these feature amounts may be used in combination to update an ID.

In step S109, the CPU 101 determines whether or not "the inference result of the tracking subject ID (the position of the tracking target subject)" stored in the RAM 102 in step S101 matches "the inference result of the tracking subject ID (the position of the tracking target subject)" stored in the RAM 102 in step S101 in the previous cycle. The determination that two positions match each other is not limited to a determination that two positions are identical to each other, and may include a determination that a difference between two positions is within a threshold.

As a result of such determination, if it is determined that two positions match each other, the processing in accordance with the flowchart of FIG. 3A with respect to the current frame ends, and if it is determined that two positions do not match each other, the procedure moves to step S110.

In step S110, the CPU 101 obtains a difference between the position of the tracking target subject stored in the RAM 102 in step S101 and the position of the tracking target subject stored in the RAM 102 in step S101 in the previous cycle. Then, the CPU 101 uses the obtained difference to obtain angular rates (vectors) in the pan direction and the tilt direction at which the image capturing unit 111 can track the tracking target subject and can capture an image thereof. For example, the CPU 101 need only perform the calculation such that the larger the difference in the horizontal direction is, the greater the angular rate in the pan direction is, and the larger the difference in the vertical direction is, the greater the angular rate in the tilt direction is.

In step S111, the CPU 101 uses the vectors obtained in step S110 to obtain drive parameters for performing pan and tilt toward the tracking target subject at a desired speed. Specifically, the CPU 101 obtains drive parameters for controlling respective motors (not shown) for pan/tilt directions that are included in the drive unit 109.

In step S112, the CPU 101 performs drive control on the drive unit 109 via the drive I/F 108 based on the drive parameters obtained in step S111, and the drive unit 109 rotates in accordance with the drive control. With this, it is possible to change the image capturing direction of the image capturing unit 111, that is to say, it is possible to perform pan/tilt operations.

Note that the CPU 101 may obtains a parameter for controlling the zoom position of the image capturing unit 111 so that the tracking target subject is contained as large as possible in a field angle range of the image capturing unit 111, and may perform drive control on the drive unit 109 based on the parameter.

The following describes the operation of the controller 200 with reference to the flowchart in FIG. 3B. In step S201, the CPU 201 receives transmission information transmitted from the camera 100, via the network I/F 204, and stores the received transmission information in the RAM 202.

Figure 5A:
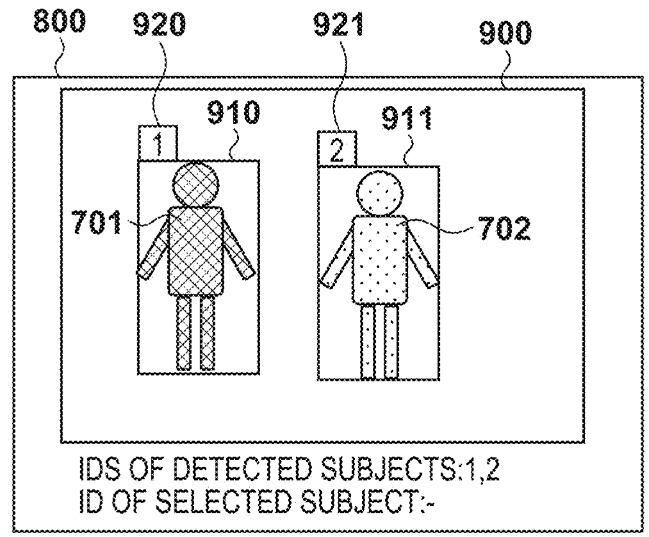
FIGS. 5A to 5C are diagrams showing display examples of captured images and inference results.

In step S202, the CPU 201 displays a captured image and an inference result contained in the transmission information stored in the RAM 202 in step S201, on the display unit 205. Display examples of the captured image and the inference result that are displayed on the display unit 205 are shown in FIG. 5A. Hereinafter, it is assumed that display control on the display screen displayed on the display unit 205 and processing performed in response to a user operation on the display screen are executed by the CPU 201.

As shown in FIG. 5A, a captured image 900 contained in the transmission information is displayed on a selection screen 800 displayed on the display screen of the display unit 205. On the captured image 900, a rectangle 910 is drawn based on the inference result corresponding to the person 701 contained in the transmission information, and a rectangle 911 is drawn based on the inference result corresponding to the person 702 contained in the transmission information. Also, on the captured image 900, "1" is given as an ID 920 of the inference result corresponding to the person 701, and "2" is given as an ID 921 of the inference result corresponding to the person 702.

Also, the above-described values of the ID 920 and the ID 921 are displayed as the detected ID in a lower portion of the selection screen 800. By viewing the selection screen 800 displayed on the display unit 205, the user of the controller 200 can check an image captured by the camera 100 and an inference result of the captured image.

Then, in step S203, the CPU 201 obtains the ID of the tracking target subject selected by the user operating the user input I/F 206, as the tracking subject ID, and stores the obtained tracking subject ID in the RAM 202. The configuration for obtaining the tracking subject ID is not limited to a specific configuration. The following describes an example of a configuration for obtaining the tracking subject ID.

By operating the user input I/F 206, the user designates, among the rectangle 910 and the rectangle 911 displayed on the selection screen 800 in FIG. 5A, the rectangle of the subject that the user desires to select as a tracking target subject. For example, the user can select a desired rectangle by pushing a joystick to the left and right, pressing down left and right buttons, or touching the desired rectangle on a touch panel screen. The method for selecting a rectangle is not limited to a specific method.

Figure 5B:
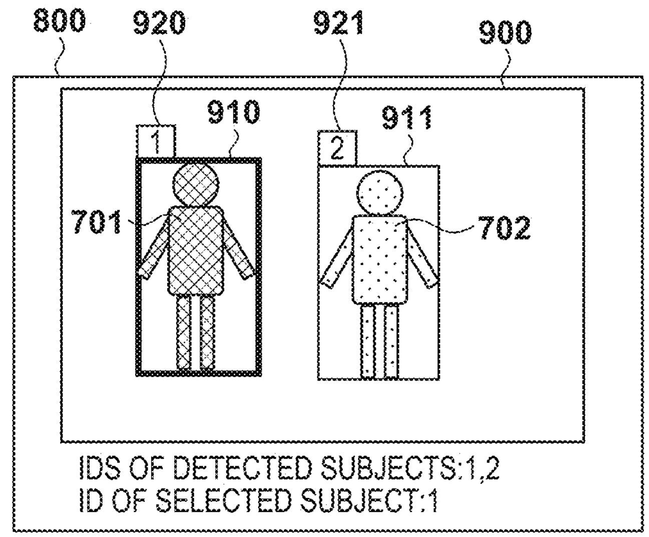

Upon operation of the user on the user input I/F 206 to select the rectangle 910, the selection screen 800 shown in FIG. 5B is displayed on the display screen 800 of the display unit 205. On the selection screen 800 of FIG. 5B, the rectangle 910 and the rectangle 911 are displayed in different display modes so as to allow the user to recognize that the rectangle 910 has been selected. At this time, since the rectangle 910 is selected, in the lower portion of the selection screen 800, "1" indicating the ID 920 of the person 701 corresponding to the rectangle 910 is displayed as a selected ID.

Figure 5C:
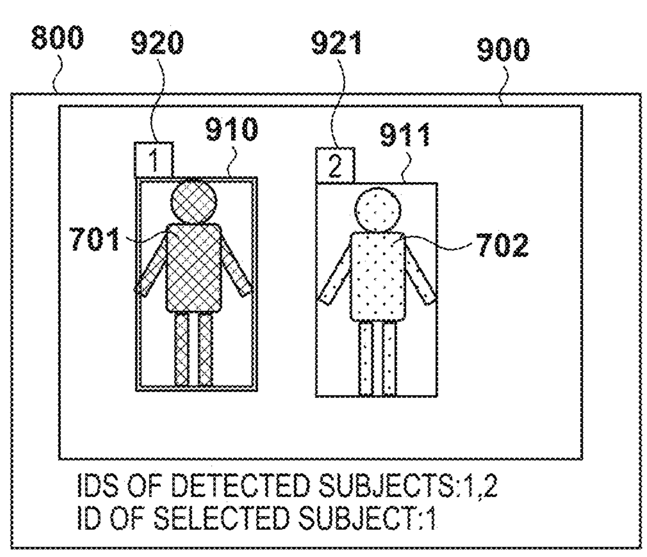

Then, upon operation of the user on the user input I/F 206 to perform operation for determining the person 701 as the tracking target subject, the selection screen 800 of FIG. 5C is displayed on the selection screen 800 of the display unit 205. On the selection screen 800 of FIG. 5C, the rectangle 910 and the rectangle 911 are displayed in different display modes so as to allow the user to recognize that the rectangle 910 has been determined.

For example, the user can determine a desired rectangle by deeply pressing a joystick, pressing down a determination button, or touching the desired rectangle twice on the touch panel screen. The method for selecting a rectangle is not limited to a specific method.

Note that the screens shown in FIGS. 5A to 5C are merely examples of the screen for allowing a user to recognize the selected state of a tracking target subject, and also the above-described operations performed on the screen are only examples. For example, the ID 910 or the ID 921, instead of a rectangle, may be selected, or the user may operate the user input I/F 206 so as to directly input the tracking subject ID.

Then, in step S204, the CPU 201 transmits the tracking subject ID stored in the RAM 202 in step S203 to the camera 100 via the network I/F 204.

Therefore, according to the present embodiment, if no subject with the same ID as a tracking subject ID is detected from a captured image, and the IDs of subjects detected from the captured image include a new ID different from the ID of the subject detected from the captured image before lost, the tracking subject ID is updated to the new ID. With this, it is possible to track a tracking target subject and capture an image even after lost has occurred.

Second Embodiment

The following describes differences from the first embodiment, and other configurations are the same as those in the first embodiment as long as they are not particularly described below. In the present embodiment, the camera 100 transmits a captured image to the controller 200, and the controller 200 generates a control command for causing the camera 100 to track a tracking target subject and transmits the generated control command to the camera 100. Then, the camera 100 tracks the tracking target subject in accordance with the control command, and captures an image of the tracking target subject.

In the present embodiment, the drive unit 109 operates in accordance with the control command transmitted from the controller 200. Also, the inference unit 210 performs operations on the captured image transmitted from the camera 100 similar to the operation of the inference unit 110, and obtains inference results of subjects contained in the captured image.

Figure 6A:
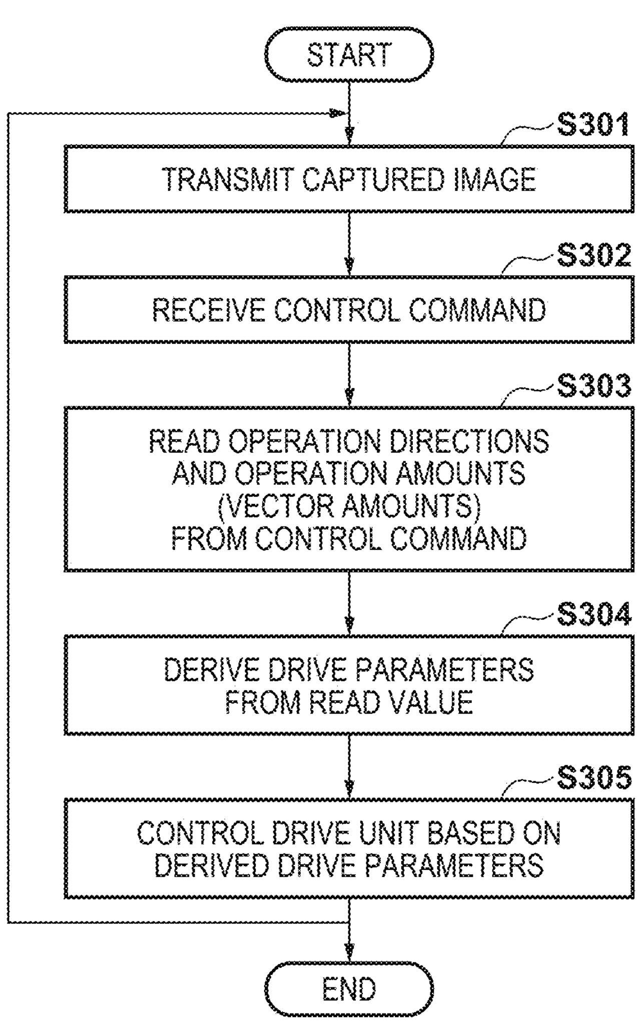
FIG. 6A is a flowchart of an operation of the camera 100.

The following describes operations of the camera 100 that operates as the image processing apparatus with reference to the flowchart in FIG. 6A. In step S301, similar to step S101 above, the image processing unit 106 generates a captured image in response to an instruction from the CPU 101, and stores the generated captured image in the RAM 102. Then, the CPU 101 transmits the captured image stored in the RAM 102 to the controller 200 via the network I/F 105.

In step S302, the CPU 101 receives the control command transmitted from the controller 200 via the network I/F 105, and stores the received control command in the RAM 102.

In step S303, the CPU 101 reads, from the control command stored in the RAM 102 in step S302, operation directions and control amounts that correspond to the pan direction and the tilt direction, respectively.

In step S304, the CPU 101 obtains drive parameters for performing pan and tilt in a desired direction at a desired speed, based on the values read in step S303. The CPU 101 may also convert the operation directions and the control amounts contained in the control command into drive parameters with reference to a conversion table stored in advance in the storage device 103.

In step S305, the CPU 101 performs drive control on the drive unit 109 via the drive I/F 108 based on the drive parameters obtained in step S304, and the drive unit 109 rotates in accordance with the drive control. With this, it is possible to change the image capturing direction of the image capturing unit 111, that is to say, it is possible to perform pan/tilt operations.

The following describes the operation of the controller 200 with reference to the flowchart in FIG. 6B. The processing according to the flowchart in FIG. 6B is processing for a captured image of one frame, and the controller 200 actually performs the processing of the flowchart in FIG. 6B for captured images of frames.

In step S401, the CPU 201 receives the captured image transmitted from the camera 100, via the network I/F 204, and stores the received captured image in the RAM 202.

In step S402, the CPU 201 inputs the captured image stored in the RAM 202 in step S401 in the inference unit 210. The inference unit 210 performs processing similar to that performed by the inference unit 110 in accordance with an instruction from the CPU 201 to generate inference results of subjects contained in the captured image, and stores the generated inference results in the RAM 202. Furthermore, similar to the first embodiment, the CPU 201 adds, to the inference result of each of the subjects, an ID unique to the corresponding subject.

In step S403, the CPU 201 displays the captured image stored in the RAM 202 in step S401 and the inference results (including IDs of the inference results) stored in the RAM 202 in step S402, on the display unit 205. Display content is the same as in the first embodiment.

In step S404, the CPU 201 accepts a user operation of selecting a tracking target subject. The user operation for selecting a tracking target subject is the same as in the first embodiment.

In step S405, the CPU 201 determines whether or not a user operation to change the tracking subject ID stored in the RAM 202 has been made. For example, the CPU 201 determines whether or not an operation of selecting a tracking target subject at the first time by the selection operation of the user, or an operation of selecting a tracking target subject different from the previous tracking target subject has been performed.

As a result of the determination, if it is determined that a user operation to change the tracking subject ID stored in the RAM 202 has been made, the procedure moves to step S407. On the other hand, if it is determined that no user operation to change the tracking subject ID stored in the RAM 202 has been made, the procedure moves to step S406.

In step S406, the CPU 201 determines whether or not any determined tracking subject ID is stored in the RAM 202 (whether or not any tracking subject ID has been determined), using the same method as in step S104. As a result of the determination, if any determined tracking subject ID is stored in the RAM 202 (any tracking subject ID has been determined), the procedure moves to step S408. On the other hand, if it is determined that no determined tracking subject ID is stored in the RAM 202 (the tracking subject ID has not been determined), the procedure moves to step S401. In step S407, the CPU 201 stores the ID of the subject selected as the tracking target subject as a tracking subject ID in accordance with the user operation, in the RAM 202.

In step S408, similar to step S106, the CPU 201 determines whether or not the subject corresponding to the same ID as the tracking subject ID has been detected from the captured image of the current frame.

As a result of the determination, if it is determined that the subject corresponding to the same ID as the tracking subject ID has been detected, the procedure moves to step S411. On the other hand, if it is determined that the subject corresponding to the same ID as the tracking subject ID has not been detected, the CPU 201 determines that the tracking target subject is lost and stores the current time T in the RAM 202, as in the first embodiment. Then, the procedure moves to step S409.

In step S409, similar to step S107, the CPU 201 determines whether or not the IDs of the inference results of subjects detected from the current frame include any new ID different from the IDs of the inference results of subjects detected from the frame before the time T.

As a result of such determination, if the IDs of the inference results of subjects detected from the current frame include any new ID, the procedure moves to step S410. On the other hand, if the IDs of the inference results of subjects detected from the current frame do not include any new ID, the procedure moves to step S401.

In step S410, the CPU 201 updates the tracking subject ID stored in the RAM 202 to the new ID. In step S411, similar to step S109, the CPU 201 determines whether or not "the inference result of the tracking subject ID (the position of the tracking target subject)" stored in the RAM 202 in step S402 matches "the inference result of the tracking subject ID (the position of the tracking target subject)" stored in the RAM 202 in step S402 in the previous cycle.

As a result of such determination, if it is determined that the two positions match each other, the processing in accordance with the flowchart of FIG. 6A with respect to the current frame ends, and if it is determined that the two positions do not match each other, the procedure moves to step S412.

In step S412, similar to step S110, the CPU 201 obtains a difference between the position of the tracking target subject stored in the RAM 202 in step S402 and the position of the tracking target subject stored in the RAM 202 in step S402 in the previous cycle. Then, the CPU 201 uses the obtained difference to obtain angular rates (vectors) in the pan direction and the tilt direction at which the image capturing unit 111 can track the tracking target subject and can capture an image thereof.

In step S413, the CPU 201 converts data on the vectors obtained in step S412 into a control command in accordance with a protocol predetermined as a method for controlling the camera 100, and stores the control command in the RAM 202.

In step S414, the CPU 201 transmits the control command stored in the RAM 202 in step S413 to the camera 100 via the network I/F 204.

In this way, the present embodiment can achieve the same effects as those in the first embodiment, even when the controller 200 has the functions of generating a control command for causing the camera 100 to track a tracking target subject, and transmitting the generated control command to the camera 100.

The numeric values, processing timings, the orders of processing, operators of processing, acquisition method/destination/storage place of data (information) and the like that are used in the above-described embodiments are examples for specific description, and the present invention is not intended to be limited to such examples.

Also, some or all of the above-described embodiments may be used in combination as appropriate. Also, some or all of the above-described embodiments may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-089116, filed May 30, 2023, and Japanese Patent Application No. 2024-008828, filed Jan. 24, 2024 which are hereby incorporated by reference herein in their entirety.

What is claimed is:

1. An image processing apparatus comprising one or more memories storing instructions and one or more processors that execute the instructions to:

detect subjects from a frame;

if no subject having same identification information as identification information of a tracking target subject is detected from a first frame, and identification information of subjects detected from the first frame includes new identification information different from identification information of subjects detected from a second frame, which is a frame before a timing at which the tracking target subject is no longer detected, update the identification information of the tracking target subject to the new identification information, and if a feature amount of a subject having new identification information detected after a timing at which the tracking target subject is no longer detected is close to a feature amount of the tracking target subject detected before the tracking target subject is no longer detected, select the subject having new identification information detected after the timing at which the tracking target subject is no longer detected, as a tracking target subject.

2. The image processing apparatus according to claim 1, wherein it is determined whether or not to update the identification information of the tracking target subject to the new identification information based on whether or not a position of a subject corresponding to the new identification information is located within a range.

3. The image processing apparatus according to claim 2, wherein a size of the range is changed according to a size of the tracking target subject before the timing.

4. The image processing apparatus according to claim 2, wherein a size of the range is changed according to a moving speed of the tracking target subject before the timing.

5. The image processing apparatus according to claim 2, wherein a shape of the range is changed based on a moving direction of the tracking target subject before the timing.

6. The image processing apparatus according to claim 2, wherein a size of the range is changed according to elapsed time from the timing.

7. The image processing apparatus according to claim 1, wherein the one or more processors execute the instruction to capture an image, wherein the subjects are detected from a captured frame.

8. The image processing apparatus according to claim 7, wherein the one or more processors execute the instructions to control the capturing so that, among the subjects detected from the captured frame, a subject having the same identification information as the identification information of the tracking target subject is tracked and captured.

9. The image processing apparatus according to claim 1, wherein the subjects are detected from a frame received from an external image capturing unit capable of communicating with the image processing apparatus.

10. The image processing apparatus according to claim 9, wherein the one or more processors execute the instructions to generate a control command for controlling the capturing so that a subject having the same identification information as the identification information of the tracking target subject is tracked and captured, and to transmit the control command.

11. The image processing apparatus according to claim 1, wherein the feature amount includes at least one of an orientation, a body shape, a pose, a size and an aspect ratio of the subject.

12. The image processing apparatus according to claim 1, wherein the feature amount includes at least one of a color and a histogram of the subject.

13. An image processing method performed by an image processing apparatus, the method comprising:

detecting subjects from a frame;

if no subject having same identification information as identification information of a tracking target subject is detected from a first frame, and identification information of subjects detected from the first frame includes new identification information different from identification information of subjects detected from a second frame, which is a frame before a timing at which the tracking target subject is no longer detected, updating the identification information of the tracking target subject to the new identification information, and if a feature amount of a subject having new identification information detected after a timing at which the tracking target subject is no longer detected is close to a feature amount of the tracking target subject detected before the tracking target subject is no longer detected, selecting the subject having new identification information detected after the timing at which the tracking target subject is no longer detected, as a tracking target subject.

14. A non-transitory computer-readable storage medium storing a computer program that causes a computer to execute the instructions to:

detect subjects from a frame;

if no subject having same identification information as identification information of a tracking target subject is detected from a first frame, and identification information of subjects detected from the first frame includes new identification information different from identification information of subjects detected from a second frame, which is a frame before a timing at which the tracking target subject is no longer detected, update the identification information of the tracking target subject to the new identification information, and if a feature amount of a subject having new identification information detected after a timing at which the tracking target subject is no longer detected is close to a feature amount of the tracking target subject detected before the tracking target subject is no longer detected, select the subject having new identification information detected after the timing at which the tracking target subject is no longer detected, as a tracking target subject.

* * * * *